Aug. 21, 1923.
C. S. ORTON
1,465,480
MOTOR VEHICLE CONTROL
Filed June 17, 1922
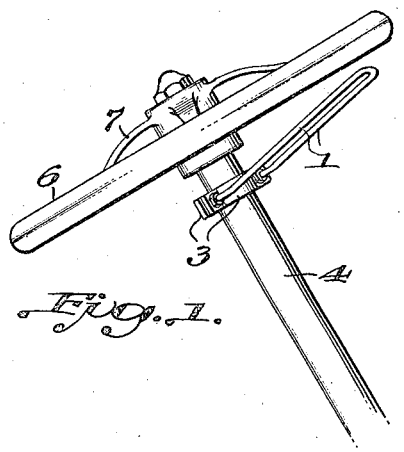
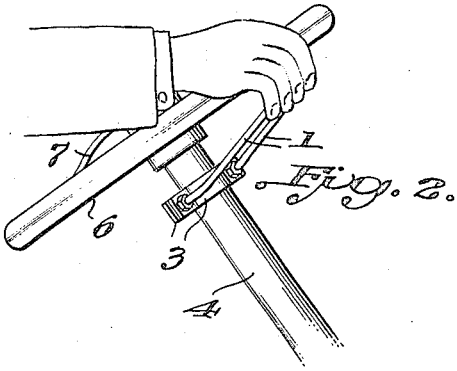
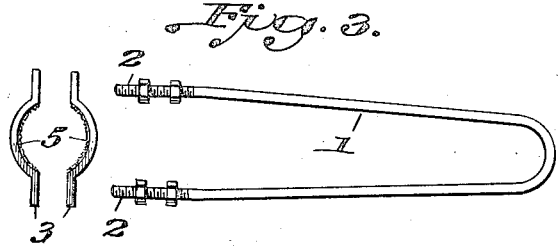
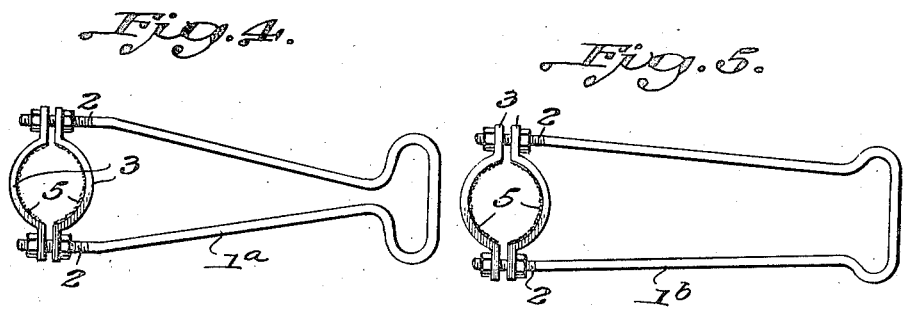
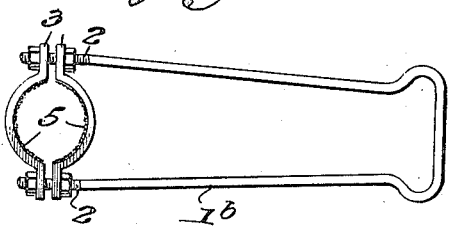

Patented Aug. 21, 1923.

1,465,480

UNITED STATES PATENT OFFICE.

CHARLES S. ORTON, OF NORTH TONAWANDA, NEW YORK.

MOTOR-VEHICLE CONTROL.

Application filed June 17, 1922. Serial No. 569,040.

*To all whom it may concern:*

Be it known that I, CHARLES S. ORTON, a citizen of the United States, residing at North Tonawanda, in the county of Niagara and State of New York, have invented certain new and useful Improvements in Motor-Vehicle Controls, of which the following is a specification.

The object of my invention is the provision of improvements which will enable the driver of a motor vehicle to look to the rear to ascertain conditions there and, further, to view the scenery along the roadway, or to look to the right or left for any purpose without accidentally turning the steering wheel and diverting the motor vehicle out of its straight course with the incident danger of an accident.

Further objects are to provide means whereby the driving of a motor vehicle is made easier, mental strain on the driver is lessened and the safety of passengers ensured.

My invention comprises means, whether carried by the steering column or by the sector, or a part of the vehicle which is stationary in relation to the steering wheel, such means being positioned conveniently to be grasped with the steering wheel by the hand of the driver so as to afford a "grip" by which the hand of the driver is enabled to hold the steering wheel against turning. Consequently, when the controlling device constituting the present invention is grasped by the driver's hand, when his hand is also gripping the steering wheel, the car will continue on its fixed course and the steering wheel will not be accidentally turned when the driver looks to the rear or to one side or the other of the roadway.

When the driver is looking straight ahead, as during regular driving, the controlling device is not grasped and steering is then accomplished as ordinarily.

The invention may assume different shapes and constructions and I do not limit myself to the embodiments hereinafter described and shown in the accompanying drawings. Furthermore, the device may be secured to the sector above the steering wheel, instead of to the steering column below the steering wheel and, indeed, it is possible to attach it to the vehicle in position for use in conjunction with the steering wheel when desired.

Preferably, the controlling device is of resilient or springy material so that it can be easily grasped and drawn toward the steering wheel and there held when used, but, in its broadest aspect, a resilient controlling device is not necessary to the principle of the invention.

In the accompanying drawings:

Figure 1 is a view showing the device attached to the steering column below the steering wheel as it appears when in normal position and not in use.

Fig. 2 is a similar view showing the hand of the driver gripping the device while grasping the steering wheel to thereby lock the steering wheel.

Fig. 3 is a detail view of that form of the invention shown in Figures 1 and 2; and Figs. 4 and 5 are detail views of modified forms of the device illustrating how other shapes may be used to meet the requirements of different drivers.

In the embodiments of the invention shown in the drawings, the controlling device comprises a spring loop or lever 1 which is preferably of general U-shape or re-bent form the legs of which are screw threaded at 2 and pass through perforations in the ends of the sections 3 of a split clamp by which the device is firmly attached to the steering column 4. Preferably the sections 3 are provided with a felt, or other suitable, lining 5 to prevent marring the steering column.

The steering wheel appears at 6 and the sector which is stationary with the steering column is shown at 7.

The device may be attached to the sector 7 and located above the steering wheel 6. In fact, the controlling device 1 need not be carried by either the steering column 4 or the sector 7 as it can be suitably attached to the vehicle and arranged conveniently close to the steering wheel 6 to be grasped by the driver in the manner hereinafter described.

The lever or controlling device 1 is preferably of resilient material so that it can be located sufficiently far from the steering wheel 6 as not to interfere with the hands of the driver during ordinary driving and yet be conveniently grasped by the fingers and drawn up and gripped by the hand of the driver as shown in Fig. 2 when it is desired to lock the steering wheel so that the driver can look rearwardly or to one side or the other without watching the road or street ahead.

I do not, however, limit the invention to a resilient device 1 as it may be so constructed and located in relation to the steering wheel that it could be conveniently gripped by the fingers as to enable the steering wheel to be held stationary.

Furthermore, the device 1 may be constructed from a flat piece of metal or corrugated metal with turned edges attached to the clamp 3 or the end of such metal piece may be turned down at its end where it is attached to the steering column so as to itself constitute one-half of the clamp.

If preferred, that portion of the steering wheel 6 which is arranged to come in contact with the lever or device 1 when the latter is drawn up may be corrugated, roughened, or notched, so as to afford a more secure hold.

In Figs. 4 and 5 I have illustrated at 1ª and 1ᵇ, respectively, other shapes or forms the lever or device 1 may assume to afford different styles of grips according to the preferences of the individual driver who may either desire a small grip for two fingers only or a grip wide enough for the entire hand.

Any embodiment of the invention may, if desired, be provided with a soft rubber or other elastic or springy handle to serve as a "grip" to come in contact with the steering wheel.

I claim:

1. The combination with the steering wheel of a motor vehicle, of means secured in the region of the central part of said wheel which is stationary in relation to said steering wheel, and has a free part located adjacent the rim of said wheel so that it may be grasped with the steering wheel by the hand of the driver for the purpose of preventing accidental turning of the steering wheel.

2. The combination with the steering wheel of a motor vehicle, of spring-actuated means secured in the region of the central part of said wheel, which is stationary in relation to said steering wheel, and has a free part located adjacent the rim of said wheel so that it may be grasped with the steering wheel by the hand of the driver for the purpose of preventing accidental turning of the steering wheel.

3. A motor vehicle controlling device comprising an inherently resilient member connected to the steering column or to the sector which is stationary in relation to the steering wheel and has a free part located adjacent the rim of said wheel so that it may serve as a grip so that the driver can grasp said member when grasping the steering wheel to thereby lock the steering wheel against turning.

4. A motor vehicle controlling device comprising an inherently resilient member of bent or bowed shape connected to the steering column or to the sector or any part of the vehicle which is stationary in relation to the steering wheel and has a free part located adjacent the rim of said wheel so that it may serve as a grip so that the driver can grasp said member when grasping the steering wheel to thereby lock the steering wheel against turning.

In testimony whereof, I affix my signature.

CHARLES S. ORTON.

Witnesses:
 ELIAS ROOT,
 GRACE M. ORTON.